(12) United States Patent
Campbell et al.

(10) Patent No.: US 9,426,357 B1
(45) Date of Patent: Aug. 23, 2016

(54) SYSTEM AND/OR METHOD TO REDUCE A TIME TO A TARGET IMAGE CAPTURE IN A CAMERA

(71) Applicant: Ambarella, Inc., Santa Clara, CA (US)

(72) Inventors: Jeffery Campbell, San Jose, CA (US); Yuchi Wei, Shenzhen (CN)

(73) Assignee: Ambarella, Inc., Santa Clara, CA (US)

( * ) Notice: Subject to any disclaimer, the term of this patent is extended or adjusted under 35 U.S.C. 154(b) by 92 days.

(21) Appl. No.: 14/012,312

(22) Filed: Aug. 28, 2013

(51) Int. Cl.
*H04N 5/232* (2006.01)
*H04N 5/235* (2006.01)
*H04N 5/907* (2006.01)

(52) U.S. Cl.
CPC .......... *H04N 5/23222* (2013.01); *H04N 5/235* (2013.01); *H04N 5/23241* (2013.01); *H04N 5/23251* (2013.01); *H04N 5/907* (2013.01)

(58) Field of Classification Search
CPC .............................................. G06K 2017/0045
See application file for complete search history.

(56) References Cited

U.S. PATENT DOCUMENTS

| 7,145,597 | B1* | 12/2006 | Kinjo | H04N 1/00132 348/222.1 |
| 7,471,334 | B1* | 12/2008 | Stenger | 348/373 |
| 8,169,461 | B2 | 5/2012 | Ek et al. | 348/14.02 |
| 2004/0075547 | A1* | 4/2004 | Vojtech et al. | 340/500 |
| 2009/0160968 | A1* | 6/2009 | Prentice | H04N 5/23245 348/223.1 |
| 2009/0231441 | A1* | 9/2009 | Walker et al. | 348/207.1 |
| 2011/0102630 | A1* | 5/2011 | Rukes | 348/223.1 |
| 2012/0099012 | A1* | 4/2012 | Ryu | H04N 5/23293 348/333.01 |

\* cited by examiner

*Primary Examiner* — Twyler Haskins
*Assistant Examiner* — Akshay Trehan
(74) *Attorney, Agent, or Firm* — Christopher P. Maiorana, PC

(57) ABSTRACT

An apparatus comprising a sensor, a motion detector, a memory and a processor. The sensor may be configured to capture a first image. The motion detector may be configured to initiate the capture of the first image. The memory may be configured to store exposure data associated with the first image. The processor may be configured to determine if the stored exposure data is usable to capture a second image.

19 Claims, 4 Drawing Sheets

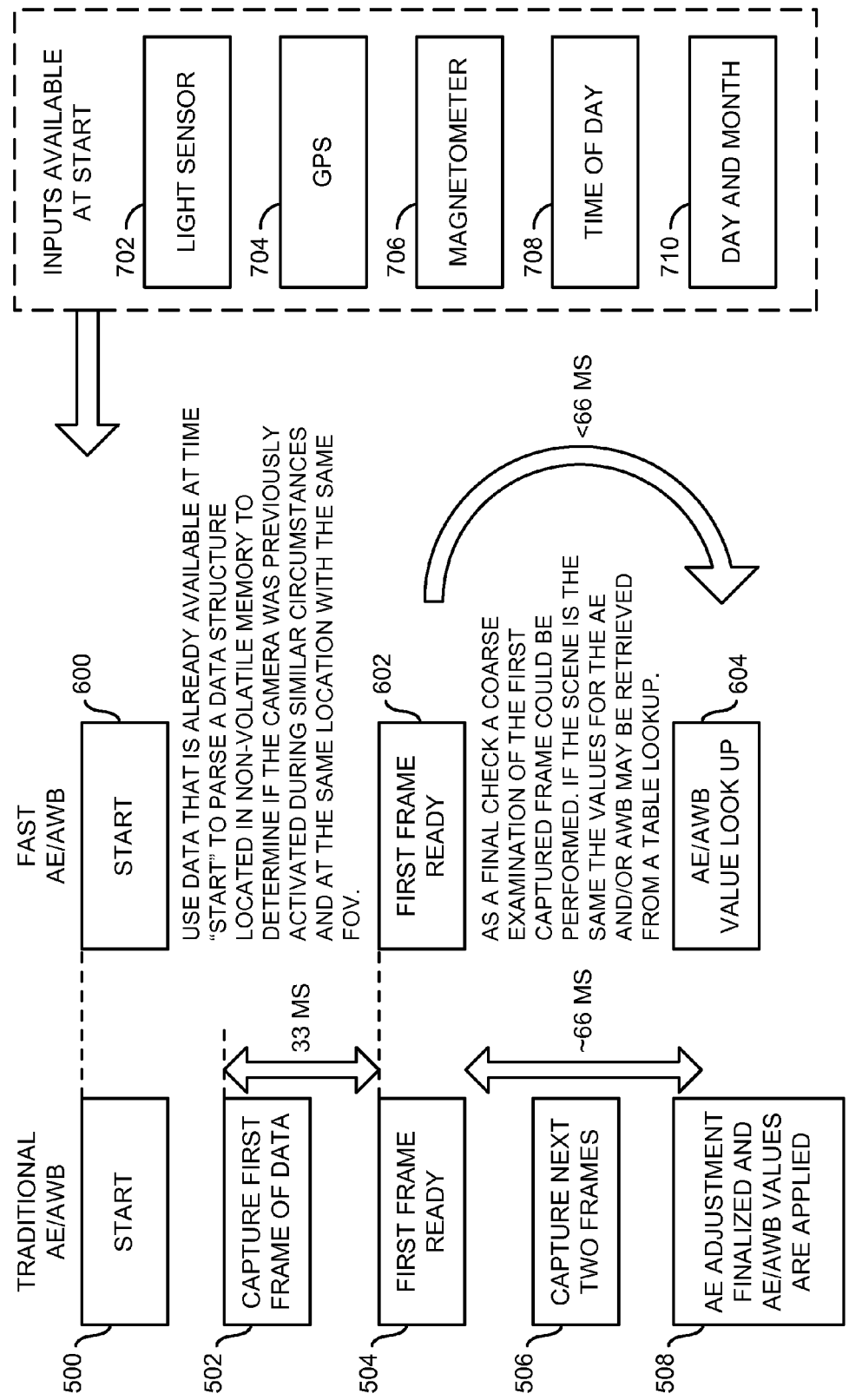

SYSTEM AND/OR METHOD TO REDUCE A TIME TO A TARGET IMAGE CAPTURE IN A CAMERA

FIELD OF THE INVENTION

The present invention relates to cameras generally and, more particularly, to a system and/or method to reduce a time to a target image capture in a camera.

BACKGROUND OF THE INVENTION

One group of conventional cameras are commonly referred to as "trail cameras". Trail cameras are battery operated and placed in remote locations.

A trail camera remains in a low power mode with only a Passive Infrared Receiver (PIR) being active. The PIR is usually monitored by a small low power micro controller (MCU). The MCU generates an interrupt to the main camera system when motion is detected in the Field Of View (FOV) of the PIR. When motion is detected, the attached camera system needs to capture the photo or video as quickly as possible. To preserve power, the main camera system is completely powered down until an event desired to be captured occurs.

The subject being captured, typically a wild animal in transit, and the fact the camera system remains powered off to extend battery life, makes fast boot up to first image important. Another characteristic of the trail cameras is that they are often installed in one location and pointed in one direction for long periods of time.

It would be desirable to leverage the use pattern of a camera to improve the powered-off to target image capture of the system. It would also be desirable to implement a system and/or method to reduce a time to a first image capture in a camera.

SUMMARY OF THE INVENTION

The present invention concerns an apparatus comprising a sensor, a motion detector, a memory and a processor. The sensor may be configured to capture a first image. The motion detector may be configured to initiate the capture of the first image. The memory may be configured to store exposure data associated with the first image. The processor may be configured to determine if the stored exposure data is usable to capture a second image.

The objects, features and advantages of the present invention include providing a camera that may (i) reduce a time to a first image capture, (ii) use stored exposure data to capture a current image, (iii) determine if stored exposure data is useful in processing a current image to be captured and/or (iv) be cost effective to implement.

BRIEF DESCRIPTION OF THE DRAWINGS

These and other objects, features and advantages of the present invention will be apparent from the following detailed description and the appended claims and drawings in which:

FIG. 5 is a diagram illustrating a time line for a start up.

DETAILED DESCRIPTION OF EMBODIMENTS

Figure 1:
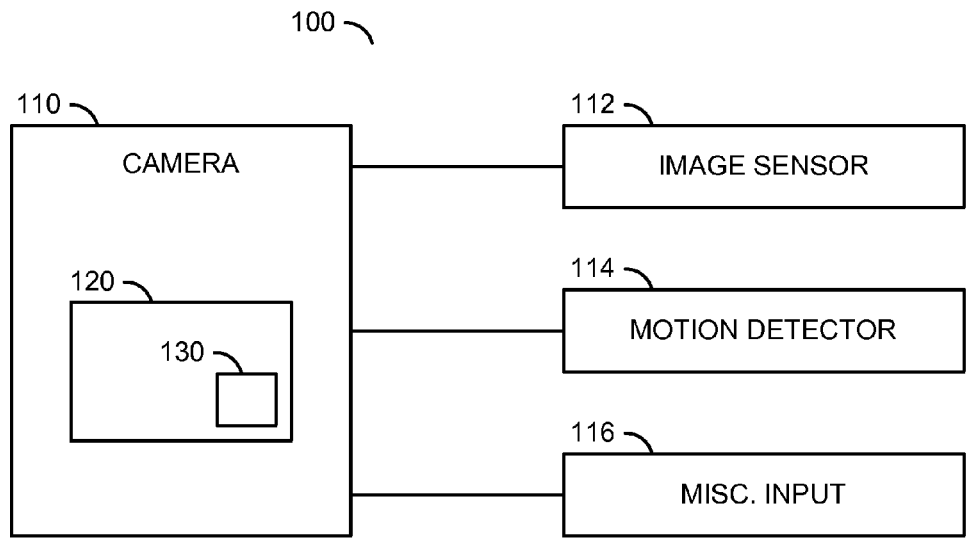
FIG. 1 is a block diagram of an embodiment of the invention.

Referring to FIG. 1, a block diagram of a circuit (or system) 100 is shown in accordance with a preferred embodiment of the present invention. The circuit 100 may be implemented as a trail camera. In another example, the circuit 100 may be implemented as another type of portable device, such as a cellular telephone, smart phone, etc. The circuit 100 generally comprises a block (or circuit) 110, a block (or circuit) 112, a block (or circuit) 114 and a block (or circuit) 116. The circuit 110 may be implemented as a camera module. The circuit 112 may be implemented as an image sensor configured to capture an image. The circuit 114 may be implemented as a motion detector. In one example, the circuit 114 may be implemented as a passive infrared receiver (PIR). However, the particular type of motion detector implemented may be varied to meet the design criteria of a particular implementation. The circuit 116 may be implemented as a circuit configured to present various usage details (e.g., a light sensor, a GPS, a magnetometer, a time of day, a day and month, etc.).

The camera module 110 may include a block (or circuit) 120. The circuit 120 may be implemented as a processor. The processor 120 may include a block (or circuit) 130. The circuit 130 may be implemented as a memory. The process of the present invention may be implemented as computer readable instructions stored in the memory 130. The instructions may be executed by the processor. With such an implementation, the additional overhead of the process described may be cost effective.

The circuit 100 may gather information from available sensors during a system boot time. All or part of the time during an initial frame capture may be used to determine if the camera 110 has been moved from a previous location and/or if one or more scene conditions are similar and/or substantially identical to conditions previously encountered.

Figure 2:
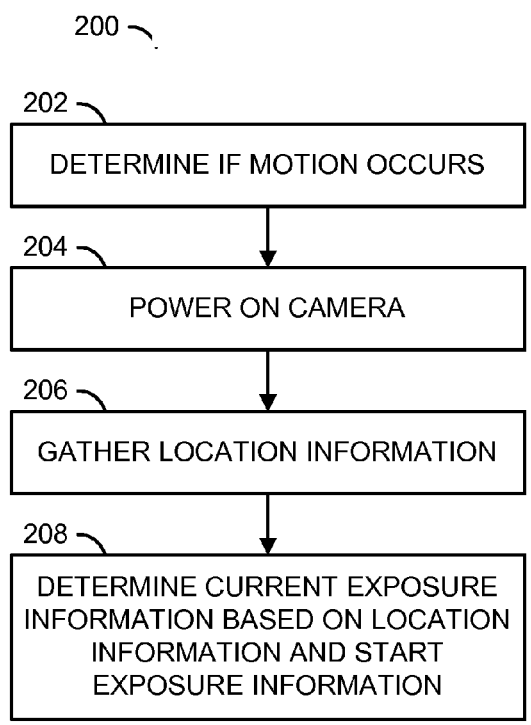
FIG. 2 is a flow diagram of a process for capturing an image.

Referring to FIG. 2, a flow diagram of a method (or process) 200 is shown. The method 200 generally comprises a step (or state) 202, a step (or state) 204, a step (or state) 206 and a step (or state) 208. The step 202 uses the sensor circuit 114 to determine when motion is flagged in the field of view. The state 204 powers on the camera 110. The regular boot cycle of the camera 110 is initiated. In addition, the MCU 120 would also power on the array of sensors 112-116 to gather a variety of location and/or environmental information. The environmental and/or location information is fed to the main camera system 110 after the main camera system is able to accept and/or analyze information. The state 206 gathers location information. The state 208 determines a current exposure based on the location information and/or the start exposure information.

The camera 110 considers the possibility that the camera 110 has moved or that the scene in the FOV needs live sensor image data to dynamically calculate the Auto Exposure (AE) and/or Auto White Balance (AWB). The camera 110 begins capturing frame data from the image sensor 112. In parallel with the frame data capture, the camera 110 analyzes the environmental and/or location information and applies a location process.

Figure 3:
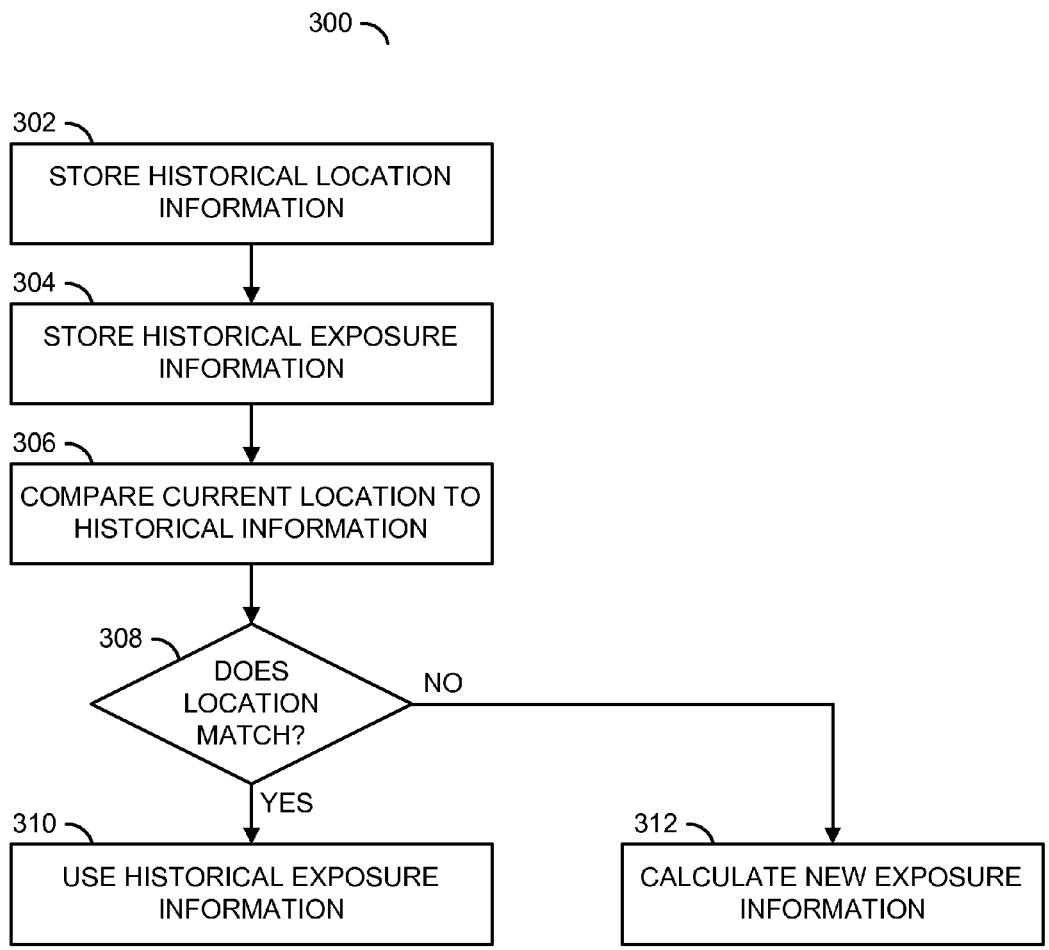
FIG. 3 is a flow diagram of a process to determine whether historical exposure information is useful.

Referring to FIG. 3, a process 300 for determining whether historical exposure information is useful (e.g., usable to reduce a task for capturing a first image) is shown. The process 300 generally comprises a step (or state) 302, a step (or state) 304, a step (or state) 306, a step (or state) 308, a step (or state) 310, and a step (or state) 312. The state 302 stores historical location information. The state 304 stores historical exposure information. The state 306 compares a current location to a location used to generate the historical exposure information. The step 306 compares the current location (e.g., new data) to a historical location. The decision state 308 determines if the locations match. If so, the method 300 moves to the state 310, which uses the historical exposure information for that location. If not, the method 300 moves to the state 312. The state 312 calculates a new exposure information. The decision state 308 has been described as comparing the location information. However, the state 308 may be modified to compare other information related to similar exposures. For example, the state 308 may compare a time of day, a time of year, etc. to determine whether the historical exposure information is usable. The historical information in the state 308 may be used in addition to location information.

The process 300 determines if the camera 110 is in the same location as previous power cycles. The state 306 may also determine if the direction of the camera and lens was the same. The step 302 stores historically calculated values for AWB and/or AE. For example, the first time the system boots up at a certain time of day, and in a certain location, a table entry may be stored in the non-volatile memory 130. The information stored may include dynamically generated values for AE and/or AWB. Subsequent power cycles would determine if the same environmental, positional, and/or locality conditions had been encountered previously by accessing the table.

If the process 300 is able to determine that similar conditions have been encountered previously, the values AE and/or AWB may be read from the historical table. The value for the AWB may be part of an AE configuration. The values may be applied to the sensor and/or image pipeline of the camera 110. Using historical configuration values for AE and/or AWB may save considerable time when compared with sampling incoming data from the sensor 112. The system 100 may save 66 ms or more of time-to-first-image by avoiding the traditional approach. This value would represent a 5% to 10% time savings in today's systems.

Figure 4:
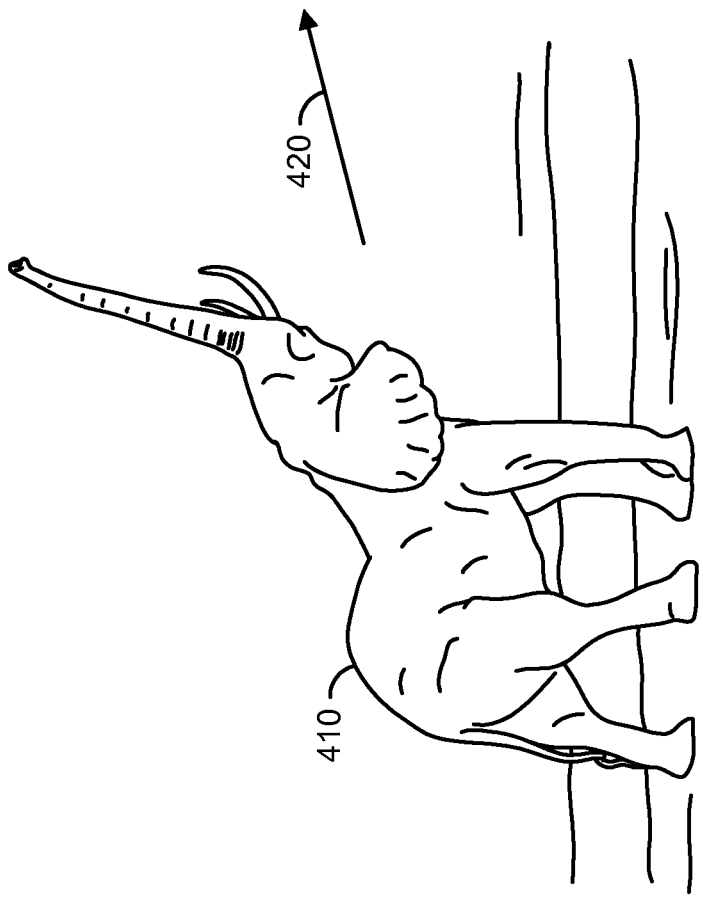
FIG. 4 is a diagram illustrating capturing of an image.

Referring to FIG. 4, a diagram of the system is shown capturing an image. A field of view 400 is shown. The system 100 may be used to capture an image of an object 410. The image may be a still frame, or one of a series of frames of a video sequence. In one example, the object 410 may be an animal. The animal may move in a direction shown by the arrow 420. The movement of the animal in the direction of the arrow 420 may trigger the motion detector 114 (not shown), which may then begin the capture process. Since the system 100 normally sits for a long period of time in a power down state, the motion of the animal 410 normally triggers the wake up of the system 100.

Referring to FIG. 5, a diagram showing a time line for starting the system 100 is shown. The time line on the left is shown comprising a state 500, a state 502, a state 504, a state 506, and a state 508. The time line on the right is shown comprising a state 600, a state 602, and a state 604. The time from the start state to the capture of the first frame is shown as approximately 33 ms. This time may be varied, but would be consistent between a traditional approach, and an approach using the system 100. For example, if further improvements to the overall speed of the capture of a frame are made, those improvements would also be useful using the system 100 to even further reduce the time to capturing the first frame. The state 504 illustrates when the first frame is ready. The state 506 captures two more frames, which takes approximately 66 ms (at 33 ms per frame). The state 508 makes adjustments to the AE and/or AWB values. With the system 100, the start state 600 captures a first frame (e.g., a still frame or a first frame of a video sequence), and indicates the first frame is ready after approximately 33 ms, plus a time to boot the sensor 112. Additional frames are not needed to be captured, so the system 100 moves to the step 604, which looks up values for configurations of AE and/or AWB. The time to look up the values for AE and AWB is significantly less than the 66 ms needed to recalculate these values after two more frame captures. The various inputs used to calculate whether the historical AE and/or AWB values are usable are shown as a sensor 702, a sensor 704, a sensor 706, an input 708 and an input 710. The sensor 702 may be a light sensor. The sensor 704 may be a GPS. The sensor 706 may be a magnetometer. The input 708 may receive a time of day. The input 710 may receive a day and month.

The system 100 is designed to be flexible to accommodate configurations that have only a subset of sensors and/or associated data available. For example, if the system 100 has a lux meter, the camera 110 may quickly determine if the scene is a night scene or a day scene. If GPS coordinate information is available, the system 100 may know if the camera 110 was in the same location. Magnetometer information may be used to see if the camera 110 was aligned in the same direction in relation to the magnetic pole of the Earth. RTC (real time clock) information may be used for time of day information. Monthly and/or seasonal information may be used to compensate for the location of the Sun in relation to the horizon. Other sensor information not envisioned here may be used to further enhance the system 100.

Additionally, one frame of incoming data from the sensor 112 may be used to reduce the false positive ratio of the system 100. One frame of data (or a partial frame of data) may be scanned for coarse edge data during each iteration of the process 200 and/or 300. The edge data from a frame (or partial frame) may be compared to similar data stored in the historical database in the memory 130 to provide more confidence that the scene and conditions are identical to a previous iteration.

The functions performed by the diagrams of FIGS. 2 and 3 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a memory configured to store an exposure data associated with a first image captured from a sensor prior to said apparatus entering a power down state;
a motion detector configured to initiate (i) a capture of a second image using said stored exposure data and (ii) a power on of one or more input sensors configured to gather information during a system boot time after said apparatus exits said power down state; and
a processor configured to determine if said stored exposure data from said first image is usable to calibrate exposure data used to capture future images from said sensor based on said information, wherein (i) said future images are captured without calculating said exposure data if said stored exposure data is determined to be usable and (ii) said determination of whether said stored exposure data is usable occurs during all or part of the time during the capture of said second image.

2. The apparatus according to claim 1, wherein said processor determines if said stored exposure data is usable by comparing exposure readings from said second image to said stored exposure data.

3. The apparatus according to claim 2, wherein said comparison of said exposure readings to said stored exposure data takes less time than calculating new exposure data for said future images.

4. The apparatus according to claim 1, wherein said second image comprises a still image.

5. The apparatus according to claim 1, wherein said second image comprises a first frame of a video sequence.

6. The apparatus according to claim 1, wherein said memory stores said exposure data in a look up table.

7. The apparatus according to claim 1, wherein said stored exposure data comprises a plurality of exposure configurations.

8. The apparatus according to claim 1, wherein said processor uses information from said one or more input sensors to receive a time of day to select a similar one of said stored exposure data configurations for said time of day.

9. The apparatus according to claim 1, wherein said processor uses information from said one or more input sensors to receive a GPS coordinate to select a similar one of said stored exposure data configurations for said GPS coordinate.

10. The apparatus according to claim 1, wherein said stored exposure data includes information representing an auto white balance configuration.

11. The apparatus according to claim 1, wherein said stored exposure data comprises an auto exposure configuration.

12. The apparatus according to claim 1, wherein said determination of whether said stored exposure data is usable further comprises scanning a frame of data of at least one of said second image and said future images for edge changes compared with said first image.

13. The apparatus according to claim 1, wherein said information comprises at least one of location information and environment information.

14. A method for reducing the time needed for capturing a target image comprising the steps of:
capturing a first image in response to a motion detector;
storing exposure data associated with said first image in memory prior to entering a power down state;
initiating (i) a capture of a second image using said stored exposure data and (ii) a power on of one or more input sensors configured to gather information during a system boot time after exiting said power down state; and
using a processor for determining if said stored exposure data from said first image is usable to calibrate exposure data used for capturing future images based on said information, wherein (i) said future images are captured without calculating said exposure data if said stored exposure data is determined to be usable and (ii) said determination of whether said stored exposure data is usable occurs during all or part of the time during the capture of said second image.

15. The method according to claim 14, wherein said exposure data includes information representing an auto white balance configuration.

16. The method according to claim 14, wherein said processor determines if said stored exposure data is usable by comparing exposure readings from said second image to said stored exposure data.

17. The method according to claim 16, wherein said comparison of said exposure readings to said stored exposure data takes less time than calculating new exposure data for said future images.

18. The method according to claim 14, wherein said determination of whether said stored exposure data is usable further comprises scanning a frame of data of at least one of said second image and said future images for edge changes compared with said first image.

19. The method according to claim 14, wherein said information comprises at least one of location information and environment information.

* * * * *